(12) United States Patent
Jeong et al.

(10) Patent No.: US 9,002,056 B2
(45) Date of Patent: Apr. 7, 2015

(54) IMAGE PROCESSING METHOD AND APPARATUS

(75) Inventors: Moon-sik Jeong, Suwon-si (KR);
Maksym Shevchenko, Kiev (UA);
Sergiy Kravchenko, Kiev (UA);
Seung-hwan Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 516 days.

(21) Appl. No.: 13/022,027

(22) Filed: Feb. 7, 2011

(65) Prior Publication Data

US 2011/0194769 A1 Aug. 11, 2011

(30) Foreign Application Priority Data

Feb. 5, 2010 (KR) .................. 10-2010-0011197

(51) Int. Cl.
*G06K 9/00* (2006.01)
*G06T 7/00* (2006.01)
*G06T 7/20* (2006.01)

(52) U.S. Cl.
CPC .......... *G06K 9/00355* (2013.01); *G06T 7/0093* (2013.01); *G06T 7/2006* (2013.01); *G06T 2207/10016* (2013.01); *G06T 2207/30196* (2013.01)

(58) Field of Classification Search
CPC .............. G06T 2207/10016; G06T 7/2033; G06T 7/20; G06T 7/2006; G06T 7/2013; G06T 7/2053; G06T 7/206; G06T 7/2066; G06T 7/2073; G06T 7/208; G06T 7/2086; G06T 7/2093
USPC .......................................... 382/103, 168–180
See application file for complete search history.

(56) References Cited

U.S. PATENT DOCUMENTS

| | | | | |
|---|---|---|---|---|
| 6,332,038 B1 * | 12/2001 | Funayama et al. | ............. | 382/190 |
| 6,404,455 B1 * | 6/2002 | Ito et al. | ......................... | 348/169 |
| 6,643,387 B1 * | 11/2003 | Sethuraman et al. | ......... | 382/107 |
| 6,704,439 B1 * | 3/2004 | Lee et al. | ...................... | 382/131 |
| 2001/0045979 A1 * | 11/2001 | Matsumoto et al. | ............ | 348/43 |
| 2008/0063238 A1 * | 3/2008 | Wiedemann et al. | ......... | 382/103 |
| 2009/0304234 A1 * | 12/2009 | Kondo et al. | .................. | 382/103 |
| 2011/0150274 A1 * | 6/2011 | Patwardhan et al. | ......... | 382/103 |

* cited by examiner

*Primary Examiner* — Alex Liew
(74) *Attorney, Agent, or Firm* — The Farrell Law Firm, P.C.

(57) ABSTRACT

An image processing method includes segmenting a series of obtained images, calculating a central point of each segment, and obtaining a target object based on movement variance of the central points of segments in the series of images.

27 Claims, 6 Drawing Sheets

FIG. 6

| SEGMENT | IMAGE 1 | | IMAGE 2 | | IMAGE 3 | | Σ |
|---|---|---|---|---|---|---|---|
| A | 5 | −4 | 0 | −4 | | | −3 |
| B | 5 | −4 | 5 | −4 | 0 | −4 | −2 |
| C | 5 | −4 | 5 | −4 | 5 | −4 | +3 |
| D | | | 5 | −4 | 5 | −4 | +2 |

IMAGE PROCESSING METHOD AND APPARATUS

PRIORITY

This application claims priority to Korean Patent Application No. 10-2010-0011197, filed on Feb. 5, 2010, in the Korean Intellectual Property Office, the disclosure of which is incorporated herein in its entirety by reference.

BACKGROUND OF THE INVENTION

1. Field of the Invention

The present invention relates generally to an image processing method and apparatus, and more particularly, to an image processing method and apparatus for recognizing an object by performing image segmentation.

2. Description of the Related Art

Due to the proliferation of digital cameras, digital photos and videos are commonly made. Recognition of an object or a scene included in an image captured without any restriction, by using a computer as a generic name, is referred to as generic object recognition. Currently, products such as Digital Televisions (DTV) and mobile devices having a camera are being released. In order to recognize an object, image segmentation needs to be performed in advance. A typical type of image segmentation is edge-based segmentation. However, since the edge-based segmentation has problems in accuracy and complexity, an alternative that eliminates these problems is needed.

SUMMARY OF THE INVENTION

The present invention provides an image processing method and apparatus for recognizing an object or a gesture by performing system-embeddable optimized segmentation.

According to an aspect of the present invention, there is provided an image processing method including segmenting a series of obtained images, calculating a central point of each segment, and obtaining a target object based on movement variance of the central points of segments in the series of images.

The segmenting of the series of images includes performing graph-based segmentation on the series of images.

The obtaining of the target object includes calculating a movement variance of a central point of each segment between current and previous images in the series of images, and obtaining the target object in the series segmented of images based on the movement variance.

The obtaining of the target object includes providing a value according to the movement variance, and determining a segment as the target object if a sum of the values is greater than a first threshold value.

The providing of the value includes providing a plus value if the movement variance is less than a second threshold value, and providing zero or a minus value if the movement variance is equal to or greater than the second threshold value.

The obtaining of the target object includes providing a predetermined value according to the movement variance; and determining a segment as the target object if a sum of the predetermined values is less than a first threshold value.

The providing of the value includes providing a plus value if the movement variance is equal to or greater than a second threshold value, and providing zero or a minus value if the movement variance is less than the second threshold value.

The image processing method further includes not providing a value to a segment in the current image if the movement variance is equal to or greater than a third threshold value, newly providing the value to the segment from a next image, and storing in a first storage the central points calculated in the series of images.

The image processing method also includes calculating a radius of a virtual circle having the same area as each segment with respect to the central point of the segment, and setting two neighboring segments as one new segment if a distance between the central points of the two neighboring segments is less than a sum of the radiuses of the two neighboring segments.

The image processing method further includes eliminating a segment if the segment has a size equal to or greater than a fourth threshold value or if the segment includes a boundary of the series of images, comparing information regarding the target object to information regarding objects, which is stored in a second storage, and recognizing the target object as a certain object according to a result of the comparing.

The predetermined information includes Histogram of Oriented Gradients (HOG) information including edge information, and Hue Saturation Value (HSV) information including color information.

According to another aspect of the present invention, there is provided an image processing apparatus including a segmentation unit for segmenting a series of obtained images, a calculation unit for calculating a central point of each segment, and a control unit for obtaining a target object based on movement variance of the central points of segments in the series of images.

BRIEF DESCRIPTION OF THE DRAWINGS

The above and other features and advantages of the present invention will become more apparent by describing in detail embodiments thereof with reference to the attached drawings in which:

FIG. 6 illustrates an application example of an algorithm regarding movement variance of central points of the segments illustrated in FIG. 4 or 5.

DETAILED DESCRIPTION OF EMBODIMENTS OF THE INVENTION

Figure 1:
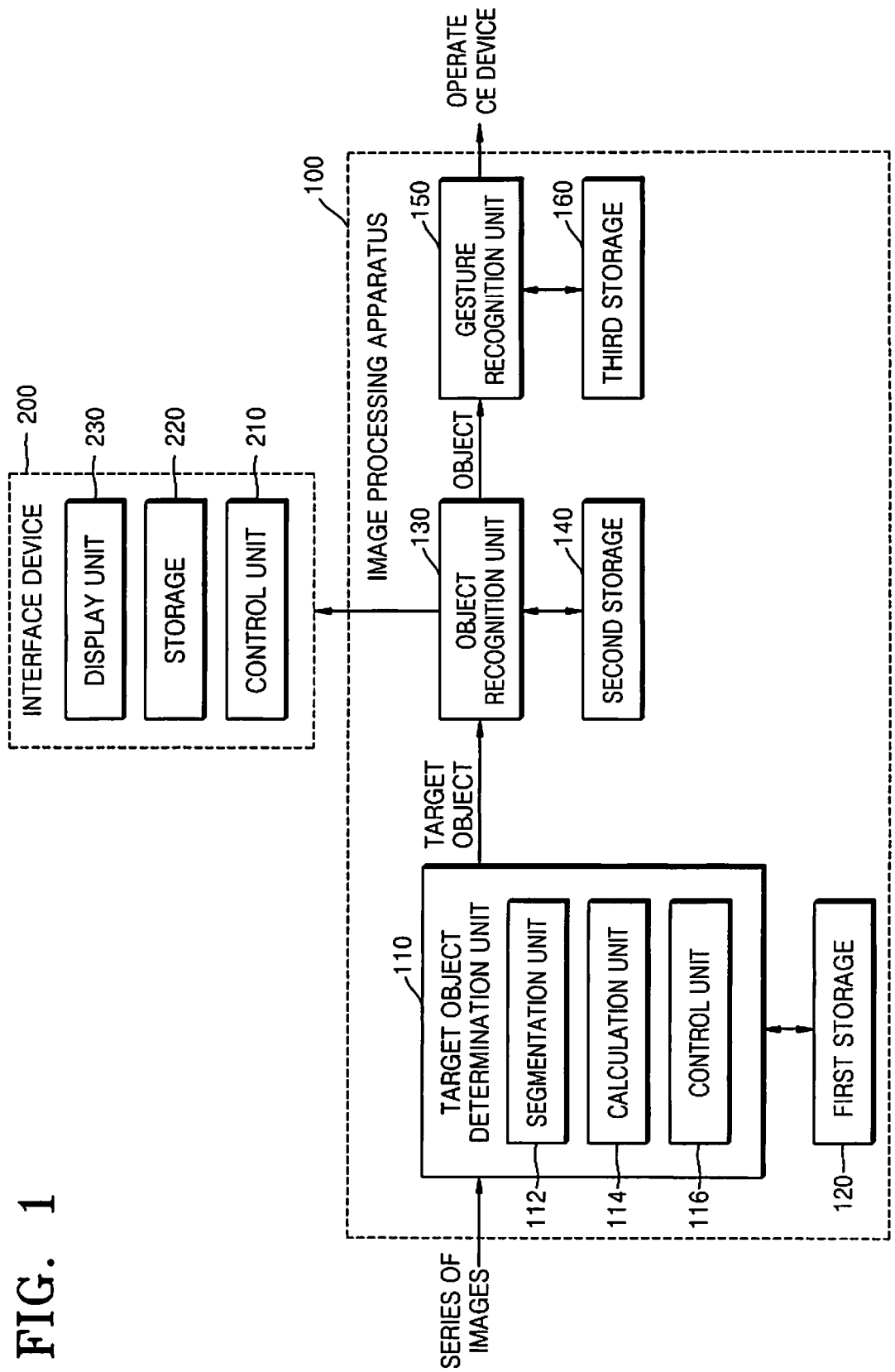
FIG. 1 illustrates an image processing apparatus according to an embodiment of the present invention.

Hereinafter, the present invention will be described in detail by explaining embodiments of the invention with reference to the attached drawings. Like reference numerals in the drawings denote like elements. In the following description of the present invention, a detailed description of known functions and configurations incorporated herein will be omitted for clarity and conciseness.

FIG. 1 illustrates an image processing apparatus 100 according to an embodiment of the present invention.

Referring to FIG. 1, the image processing apparatus 100 includes a target object determination unit 110, a first storage 120, an object recognition unit 130, a second storage 140, a gesture recognition unit 150, and a third storage 160, and the target object determination unit 110 includes a segmentation unit 112, a calculation unit 114, and a control unit 116.

The segmentation unit 112 receives a series of images obtained by an image obtaining apparatus (not shown). The images are generated by one or a plurality of image sensors including range sensors, x-ray tomography apparatuses, radars, and ultra-sonic cameras, as well as various light-sensing cameras. According to the sensor type, the obtained images may be two-dimensional (2D) or three-dimensional (3D) images, and are defined to include visual or non-visual images that are known to one of ordinary skill in the art. The image obtaining apparatus is well known in the computer field, and may include "webcams" or more technically advanced cameras. The segmentation unit 112 segments each of the received images, and performs graph-based segmentation on each of the received images. The graph-based segmentation is performed according to colors, and refers to a process of converting an image into a graph and segmenting the image by using the graph.

The calculation unit 114 calculates a central point of each segment and stores the central points of segments segmented from each image in the first storage 120. The central point refers to the center of a figure. If segmentation is performed with a uniform density, the central point may be the center of gravity. The central point is stored as a 2D coordinate in an image.

Figure 2:
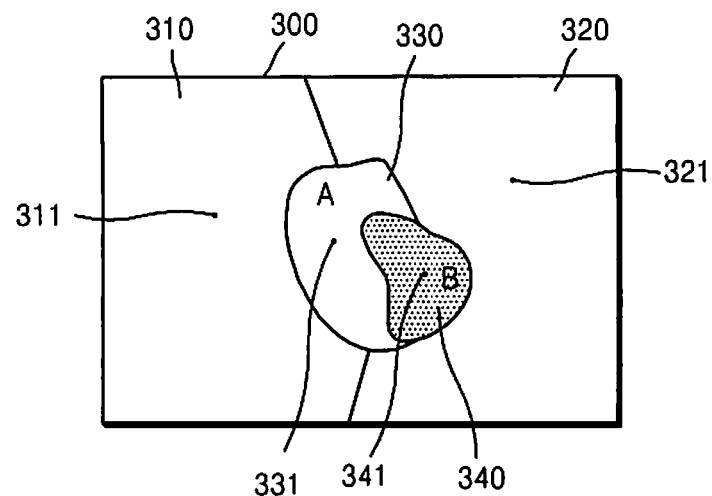
FIGS. 2 and 3 illustrate segments segmented from one image, according to an embodiment of the present invention.
Figure 3:
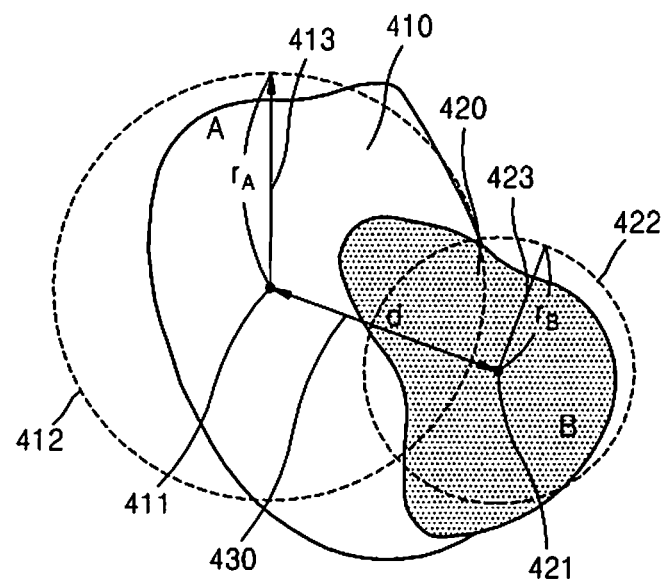

FIGS. 2 and 3 illustrate segments segmented from one image, according to an embodiment of the present invention.

Referring to FIG. 2, four segments 310, 320, 330, and 340 are segmented from one image 300, and have central points 311, 321, 331, and 341, respectively.

Referring back to FIG. 1, the calculation unit 114 calculates a radius of a virtual circle having the same area as each segment with respect to the central point of the segment, and also calculates a distance between the central points of two neighboring segments.

Referring to FIG. 3, a radius $r_A$ 413 of a virtual circle 412 having the same area as a segment A 410 with respect to a central point 411 of the segment A 410 is calculated, and a radius $r_B$ 423 of a virtual circle 422 having the same area as a segment B 420 with respect to a central point 421 of the segment B 420 is calculated. Also, a distance d 430 between the central point 411 of the segment A 410 and the central point 421 of the segment B 420 is calculated.

Referring back to FIG. 1, if a segment has a size equal to or greater than a fourth threshold value, the control unit 116 eliminates the segment. That is, the control unit 116 controls the calculation unit 114 not to calculate a radius of the segment. For example, if a segment includes a boundary of the images, the control unit 116 eliminates the segment. In FIG. 2, the control unit 116 controls the calculation unit 114 not to calculate central points of the segments 310 and 320 including boundaries of an image. If the distance between the central points of two neighboring segments is less than a sum of the radiuses of the two neighboring segments, the control unit 116 sets the two neighboring segments as one new segment. In FIG. 3, if the distance d 430 is less than a sum of the radius $r_A$ 413 of the virtual circle 412 having the same area as the segment A 410 and the radius $r_B$ 423 of the virtual circle 422 having the same area as the segment B 420, i.e., if $d < r_A + r_B$, the control unit 116 sets a new segment by combining the segment A 410 and the segment B 420.

The control unit 116 obtains a target object based on movement variance of central points of segments in a series of images. Specifically, the control unit 116 provides a value according to a movement variance of a central point of a segment between previous and current images, and sets the segment as a target object if a sum of the values in a number of images is greater than a first threshold value. For example, the control unit 116 may provide a plus value if the movement variance of the central point is less than a second threshold value, and may provide zero or a minus value if the movement variance of the central point is equal to or greater than the second threshold value. If the movement variance of the central point is very large and is equal to or greater than, for example, a third threshold value (the third threshold value>the second threshold value), the control unit 116 may not provide a value to the segment in the current image, and may newly provide a value from a next image by assuming that the segment is a newly set segment.

Unlike the above-described case, for example, the control unit 116 may provide zero or a minus value if the movement variance of the central point is less than a threshold value, and may provide a plus value if the movement variance of the central point is greater than the threshold value. In this case, the control unit 116 may set the segment as the target object if the sum of the values in a number of images is equal to or less than a threshold value.

Figure 4:
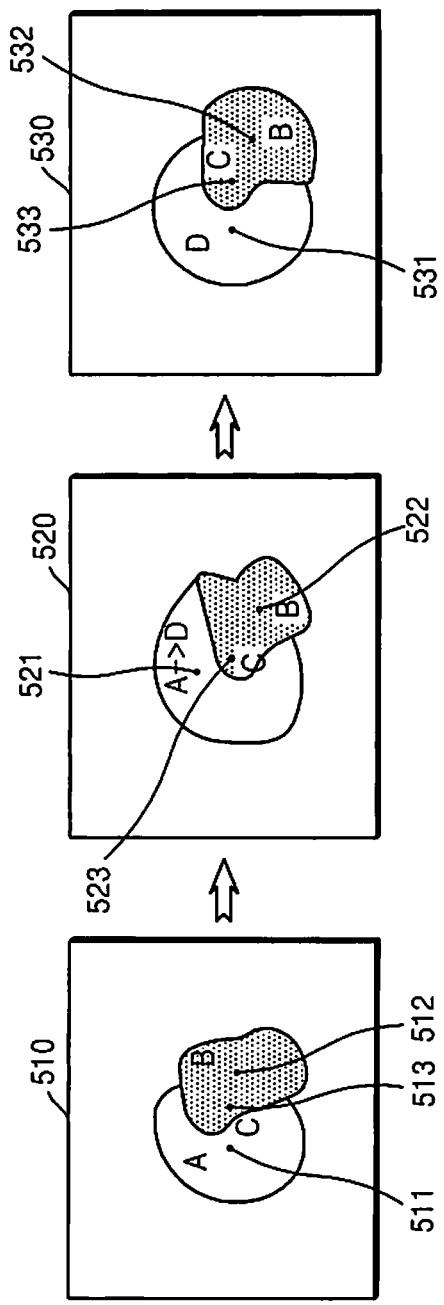
FIG. 4 illustrates a series of images from which segments are segmented, according to an embodiment of the present invention.

FIG. 4 illustrates a series of images from which segments are segmented, according to an embodiment of the present invention.

Referring to FIG. 4, an image 1 510 shows a central point 511 of a segment A, a central point 512 of a segment B, and a central point 513 of a segment C formed by combining the segments A and B. An image 2 520, i.e., a next image of the image 1 510, shows a central point 521 of a segment D newly set from the segment A, a central point 522 of the segment B, and a central point 523 of the segment C. An image 3 530, i.e., a next image of image 2 520, shows a central point 531 of the segment D, a central point 532 of the segment B, and a central point 533 of the segment C.

Figure 5:
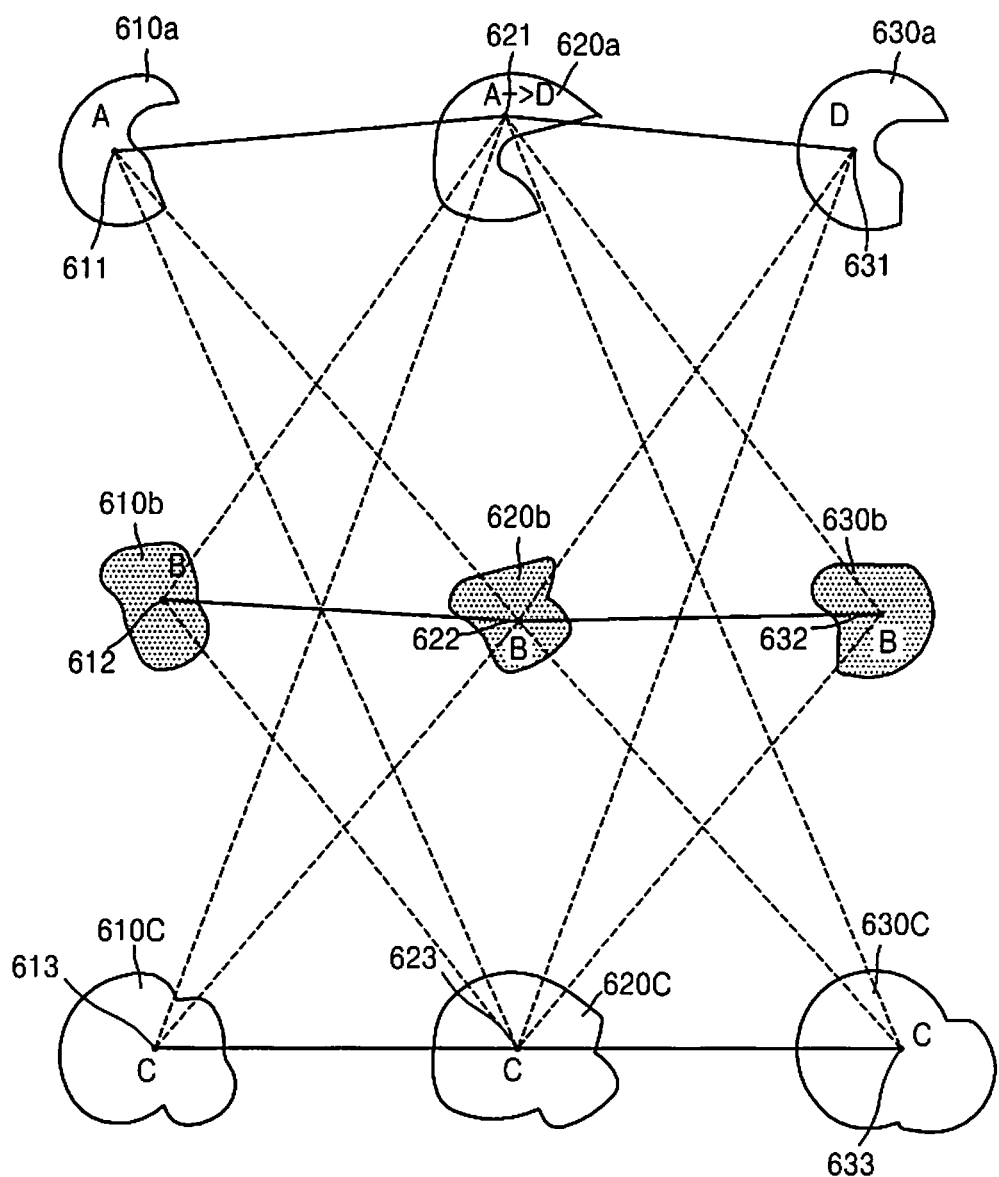
FIG. 5 illustrates the segments illustrated in FIG. 4.

FIG. 5 illustrates the segments A, B, C, and D illustrated in FIG. 4.

Segments 610a through 610c of a left column are segments in an image 1, i.e., a first image, segments 620a through 620c of a middle column are segments in an image 2, i.e., a second image, and segments 630a through 630c of a right column are segments in an image 3, i.e., a third image. The segments 610a through 610c, 620a through 620c, and 630a through 630c respectively have central points 611 through 613, 621 through 623, and 631 through 633. In order to find a segment of a next image corresponding to a segment of a current image, distances from a central point of the segment in the current image to central points of all segments in the next image are compared, and a segment of the next image having the smallest distance from the segment of the current image is recognized as the segment corresponding to the segment of the current image. For example, in order to detect segment A of image 2 corresponding to segment A of the image 1, distances from the central point 611 of segment A in image 1 to the central points 621 through 623 of all segments in the image 2 are calculated, and a segment having the smallest distance is recognized as segment A of the image 2. In FIG. 5, segment A 610b of the image 2 is closest to the segment A 610a of the image 1, and thus corresponds to the segment A 610a of the image 1.

FIG. 6 illustrates an application example of an algorithm regarding movement variance of central points of the segments A, B, C, and D illustrated in FIGS. 4 and 5. FIG. 6 illustrates an example of determining a target object when a sum of values provided according to a movement variance of a central point of a segment is greater than the first threshold value.

FIG. 6 will be described in conjunction with FIG. 5. Referring to FIG. 6, an item 710 represents the segments A, B, C, and D, items 720, 730, and 740 respectively represent values provided according to the movement variance of the central points of the segments A, B, C, and D in image 1, image 2, and image 3, and item 750 represents sums of values provided to segments A, B, C, and D. Since all segments of image 1, i.e., an initial image, do not have movement variance of central points, a certain value is provided. Values provided to the segment A (610a, 620a, and 630a in FIG. 5) according to a movement variance of a central point in the image 1 are +5 and −4 (see reference numerals 721 and 722).

Since image 1 is an initial image, certain values are provided. −4 is merely provided to prevent a very large sum of values, and thus is not essential. Since the central point of segment A in image 2 has a large difference from the central point of segment A in image 1, i.e., a previous image, 0 and −4 (see reference numerals 731 and 732) are provided. A value is not provided to segment A from a next image, and segment A is set as a new segment D to provide a value. Since segment D of image 2 is set as an initial image, the values +5 and −4 (see reference numerals 731 and 732) are provided. Since the central point of segment D in image 3 has a small difference from the central point of segment D in image 2, +5 and −4 (see reference numerals 741 and 742) are provided. Values provided to segment B (610b, 620b, and 630b in FIG. 5) according to a movement variance of a central point in the image 1, i.e., an initial image, are +5 and −4 (see reference numerals 721 and 722).

Since the central point of segment B in image 2 has a small difference from the central point of segment B in image 1, i.e., a previous image, +5 and −4 (see reference numerals 731 and 732) are provided. Since the central point of segment B in image 3 has a large difference from the central point of segment B in image 2, i.e., a previous image, 0 and −4 (see reference numerals 741 and 742) are provided. Values provided to segment C (610c, 620c, and 630c in FIG. 5) according to a movement variance of a central point in all images are +5 and −4 (see reference numerals 721, 722, 731, 732, 741, and 742) because the central point of segment C in all images has a small difference. The provided values may be predetermined by a manufacturer of the image processing apparatus 100 illustrated in FIG. 1.

As shown in the item 750, segment A has a summed value −3, segment B has a summed value −2, segment C has a summed value +3, and segment D has a summed value +2. Segment C is determined as a target object if a threshold value is 2.5. The threshold value may be set as a small value if an object to be recognized is small, and may be set as a large value if the object to be recognized is large. Also, if image segmentation needs to be performed in a short time, the threshold value may be set as a large value. The threshold value is set experimentally, and may be set adaptively to a peripheral environment.

Referring back to FIG. 1, the second storage 140 stores HOG information including edge information, and Hue Saturation Value (HSV) information including color information, regarding objects. The HOG information descriptors are feature descriptors used in computer vision and image processing for the purpose of object detection. The technique counts occurrences of gradient orientation in localized portions of an image. The HSV information designates a certain color by using a coordinate of a hue, a saturation, and a brightness or value.

The object recognition unit 130 receives information regarding the target object from the target object determination unit 110, compares the information to the HOG information and the HSV information regarding objects, and recognizes the target object as a certain object.

The gesture recognition unit 150 receives information regarding the recognized object from the object recognition unit 130, and recognizes a certain gesture by using gesture information stored in the third storage 160. A digital television or a camera may operate by using the recognized gesture as a received signal.

A control unit 210 of an interface device 200 may control a display unit 230 to display information regarding the object recognized by the object recognition unit 130. The information may be stored in a storage 220 of the interface device 200, or may be received from a server (not shown) via a wire or wireless communication network, such as the Internet. The information may be any information regarding the recognized object. For example, if the recognized object is a person, the control unit 210 of the interface device 200 may control the display unit 230 to display the information regarding the person, which is stored in the storage 220, e.g., a telephone number.

Also, if the recognized object is a document such as a book, the control unit 210 of the interface device 200 may control the display unit 230 to display the information regarding the document, which is stored in the storage 220. The above concept may be applied to education contents. Furthermore, if the recognized object is a product, the control unit 210 of the interface device 200 may control the display unit 230 to display the information regarding the product, which is stored in the storage 220 or received from the Internet. For example, a user may do the online shopping by downloading price information, shopping mall information, etc. from the Internet.

Figure 7:
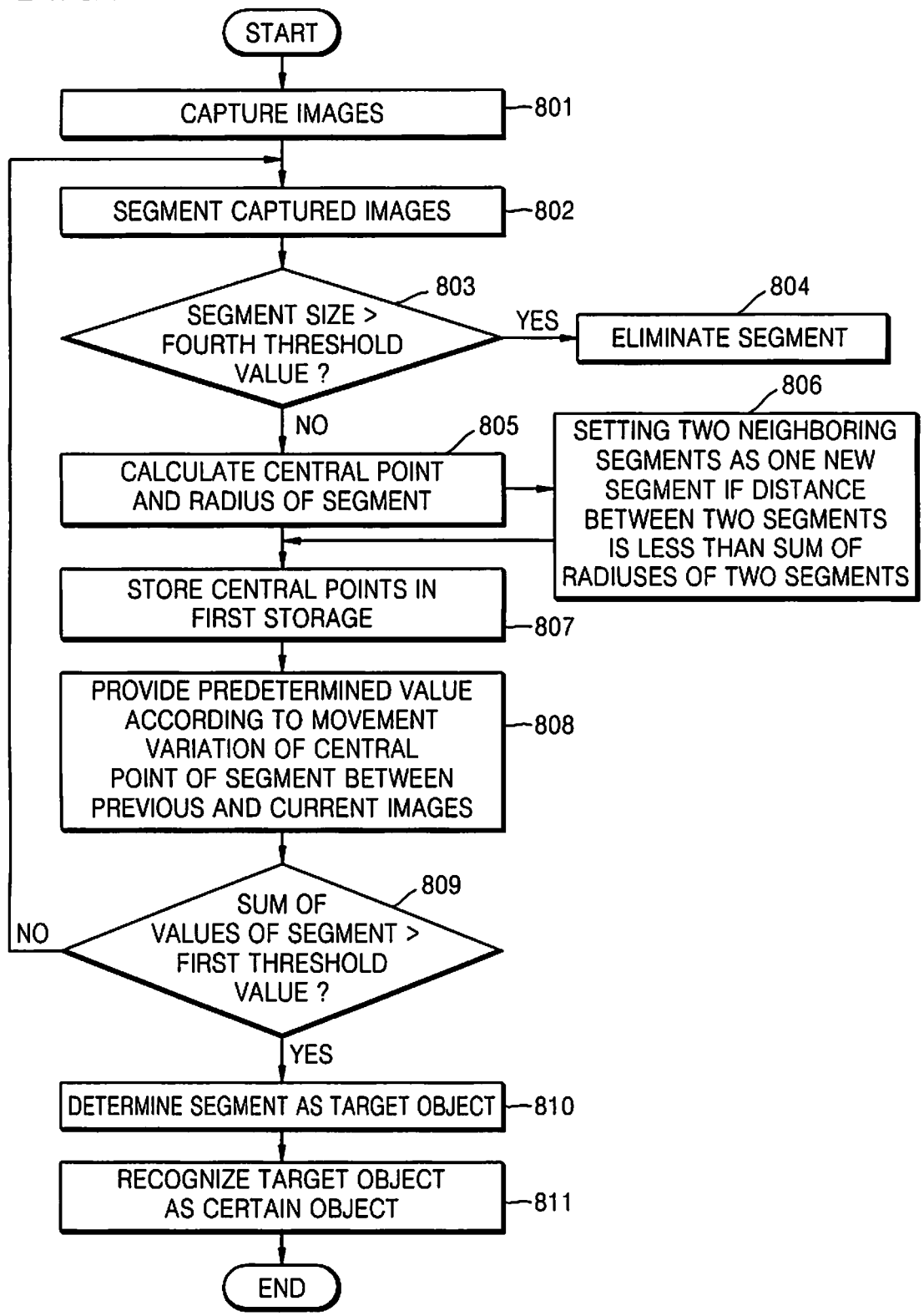
FIG. 7 illustrates an image processing method according to an embodiment of the present invention.

FIG. 7 illustrates an image processing method according to an embodiment of the present invention.

Referring to FIG. 7, in operation 801, a camera captures images. For example, a camera embedded in a television or a mobile device captures a series of images that are being monitored.

In operation 802, an image processing apparatus segments the captured images. For example, the image processing apparatus performs graph-based segmentation on each of the captured images according to colors.

In operation 803, the image processing apparatus determines whether each segment has a size greater than a fourth threshold value. If a segment has a size equal to or greater than the fourth threshold value size, the image processing method proceeds to operation 804. Otherwise, the image processing method proceeds to operation 805.

In operation 804, the segment is eliminated. For example, if a segment includes a boundary of the images, the image processing apparatus eliminates the segment.

In operation 805, the image processing apparatus calculates a central point of each segment, and calculates a radius of a virtual circle having the same area as the segment with respect to the central point of the segment. If segmentation is performed with a uniform density, the central point may be the center of gravity. The central point is stored as a 2D coordinate in an image.

In operation 806, if the distance between the central points of two neighboring segments is less than a sum of the radiuses of the two neighboring segments, the image processing apparatus sets the two neighboring segments as one new segment.

In operation 807, the image processing apparatus stores the central points of segments segmented from one image in a first storage.

In operation 808, the image processing apparatus provides a value according to a movement variance of a central point of a segment between previous and current images. For example, the image processing apparatus may provide a plus value if the movement variance of the central point is less than a threshold value, and may provide zero or a minus value if the movement variance of the central point is equal to or greater than the threshold value. Also, if the movement variance of the central point is very large and is equal to or greater than, for example, a third threshold value (the third threshold value>the second threshold value), the image processing apparatus may not provide a value to the segment in the current image, and may newly provide a value from a next image by assuming that the segment is a newly set segment.

In operation 809, the image processing apparatus determines whether a sum of the values in a number of images is greater than a first threshold value. The first threshold value may be set as a small value if an object to be recognized is small, and may be set as a large value if the object to be recognized is large. Also, if image segmentation needs to be rapidly performed, the first threshold value may be set as a large value. The first threshold value is set experimentally, and may be set adaptively to a peripheral environment.

In operation 810, the image processing apparatus sets the segment as a target object if the sum of the values is greater than the first threshold value. Unlike the above-described case, for example, in operation 808, the image processing apparatus may provide zero or a minus value if the movement variance of the central point is less than a threshold value, and may provide a plus value if the movement variance of the central point is greater than the threshold value. In this case, in operation 810, the image processing apparatus may set the segment as the target object if the sum of the values in a number of images is equal to or less than a threshold value.

In operation 811, the image processing apparatus receives HOG information including edge information and HSV information including color information, regarding objects from a second storage, compares information regarding the target object to the HOG information and the HSV information regarding objects, and recognizes the target object as a certain object. The HOG information indicates features regarding a luminance in a local region. The HSV information designates a color by using a coordinate of a hue, a saturation, and a brightness or value.

Also, the image processing apparatus receives information regarding the recognized object, and recognizes a gesture by using gesture information stored in a third storage. A digital television or a camera then operates by using the recognized gesture as a received signal.

When the image processing apparatus receives the information regarding the recognized object, an interface device may provide various interfaces. The interface device may display information regarding the object recognized by the image processing apparatus. The information may be stored in the interface device, or may be received from a server (not shown) via a wire or wireless communication network, such as the Internet. The information may be any information regarding the recognized object. For example, if the recognized object is a person, the interface device may display the information regarding the person, which is stored in the interface device, e.g., a telephone number. Also, for example, if the recognized object is a document such as a book, the interface device may display the information regarding the document, which is stored in the interface device. Furthermore, if the recognized object is a product, the interface device may display the information regarding the product, which is stored in the interface device or received from the Internet. For example, a user may do the online shopping by downloading price and shopping mall information from the Internet.

According to the present invention, object segmentation requiring simple low computing power may be performed on Consumer electronics (CE) devices that cannot easily use high computing power, e.g., a TV platform, a mobile device, and a camera to provide a user interface according to gesture recognition or object recognition, and may be used to control functions and contents of the CE devices. Also, functions and media contents of camera-embedded CE devices may be controlled by using non-touch interaction using low computing power. Furthermore, a desired image may be searched for by recognizing an object from a video sequence.

The present invention can also be implemented as computer-readable code on a computer-readable recording medium. The computer-readable recording medium is any data storage device that can store data which can be thereafter read by a computer system. Examples of the computer-readable recording medium include Read-Only Memory (ROM), Random-Access Memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, functional programs, codes, and code segments for accomplishing the present invention can be easily construed by programmers of ordinary skill in the art to which the present invention pertains.

While the present invention has been particularly shown and described with reference to embodiments thereof, it will be understood by one of ordinary skill in the art that various changes in form and details may be made therein without departing from the spirit and scope of the invention as defined by the following claims. The embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. An image processing method, comprising:
   segmenting each image in a series of obtained images into segments;
   calculating a central point of each segment, wherein the central point of each segment corresponds to a center of a figure of the segment;
   calculating a distance between at least two central points of two neighboring segments; and
   setting at least one segment selected from among segments appearing in a plurality of the images as a target object based on movement variances determined for the central points of the segments throughout the series of images.

2. The image processing method of claim 1, wherein setting at least one segment from among the segments as the target object comprises:
   calculating a movement variance of a central point of each segment between sequential pairs images in the series of images; and
   setting at least one segment from among the segments as the target object in the series of segmented images based on the calculated movement variances.

3. The image processing method of claim 2, wherein setting at least one segment from among the segments as the target object comprises:
   determining movement values of each segment according to the movement variances corresponding to the segment; and determining a segment as the target object if a sum of the movement values corresponding to the segment is greater than a first threshold value.

4. The image processing method of claim 3, wherein determining the movement value comprises:
    determining a positive movement value corresponding to a segment if the movement variance corresponding to the segment with respect to a sequential pair of images is less than a second threshold value; and
    providing a non-positive movement value if the movement variance is at least equal to the second threshold value.

5. The image processing method of claim 2, wherein setting at least one segment from among the segments as the target object comprises:
    determining movement values of each segment according to the movement variance corresponding to the segment; and
    determining a segment as the target object if a sum of the movement values corresponding to the segment is less than a first threshold value.

6. The image processing method of claim 5, wherein determining the movement values comprises:
    determining a positive movement value if a corresponding movement variance is at least equal to a second threshold value; and
    determining a non-positive movement value if the movement variance is less than the second threshold value.

7. The image processing method of claim 2, further comprising:
    refraining from determining a movement value for a segment in a current image if the movement variance of the segment with respect to the current image and an immediately previous image is at least equal to a third threshold value.

8. The image processing method of claim 1, further comprising storing, in a first storage, the central points calculated in the series of images.

9. The image processing method of claim 1, further comprising:
    calculating, for each segment, a radius of a virtual circle having a same area as a corresponding segment with respect to the central point of the corresponding segment; and
    setting two neighboring segments within an image as one new segment if a calculated distance between the central points of the two neighboring segments is less than a sum of the radiuses of the two neighboring segments.

10. The image processing method of claim 1, further comprising eliminating a segment if a size of the segment is at least equal to a fourth threshold value.

11. The image processing method of claim 1, further comprising eliminating a segment if the segment comprises a boundary of an image that includes the segment.

12. The image processing method of claim 1, further comprising:
    comparing information regarding the target object to information regarding objects that are stored in a second storage; and
    recognizing the target object as a certain object from among the objects stored in the second storage according to a result of the comparison.

13. The image processing method of claim 11, wherein the information regarding objects includes Histogram of Oriented Gradients (HOG) information including edge information, and Hue Saturation Value (HSV) information including color information.

14. An image processing apparatus, comprising:
    a segmentation unit for segmenting each image in a series of obtained images into segments;
    a calculation unit for calculating a central point of each segment, wherein the central point of each segment corresponds to a center of a figure of the segment;
    calculating a distance between at least two central points of two neighboring segments; and
    a control unit for setting at least one segment selected from among segments appearing in a plurality of the images as a target object based on movement variances determined for the central points of the segments throughout the series of images.

15. The image processing apparatus of claim 14, wherein the calculation unit calculates a movement variance of a central point of each segment between sequential pairs of subsequent images in the series of images, and
    wherein the control unit sets at least one segment from among the segments as the target object in the series of segmented images based on the calculated movement variances.

16. The image processing apparatus of claim 15, wherein the control unit determines movement values of each segment according to the movement variances corresponding to the segment, and determines a segment as the target object if a sum of the movement values corresponding to the segment is greater than a first threshold value.

17. The image processing apparatus of claim 16, wherein the control unit determines a positive movement value corresponding to a segment if the movement variance corresponding to the segment with respect to a sequential pair of images an image is less than a second threshold value, and provides a non-positive movement value if the movement variance with respect to the sequential pair of images is at least equal to the second threshold value.

18. The image processing apparatus of claim 15, wherein the control unit determines movement values of each segment according to the movement variance corresponding to the segment, and determines a segment as the target object if a sum of the movement values corresponding to the segment is less than a first threshold value.

19. The image processing apparatus of claim 18, wherein the control unit determines a positive movement value if a corresponding movement variance is at least equal to a second threshold value, and determines a non-positive movement value if the corresponding movement variance is less than the second threshold value.

20. The image processing apparatus of claim 15, wherein the control unit does refrains from determining a movement value for a segment in a current image if the movement variance of the segment with respect to the current image and an immediately previous image is at least equal to a third threshold value.

21. The image processing apparatus of claim 14, wherein the calculation unit stores, in a first storage, the central points calculated in the series of images.

22. The image processing apparatus of claim 14, wherein the calculation unit calculates, for each segment, a radius of a virtual circle having a same area as a corresponding segment with respect to the central point of the corresponding segment, and sets two neighboring segments within an image as one new segment if a calculated distance between the central points of the two neighboring segments is less than a sum of the radiuses of the two neighboring segments.

23. The image processing apparatus of claim 14, wherein the control unit eliminates a segment if a size of the segment is at least equal to a fourth threshold value.

24. The image processing apparatus of claim 14, wherein the control unit eliminates a segment if the segment comprises a boundary of an image that includes the segment.

25. The image processing apparatus of claim 14, further comprising:
- a second storage for storing information regarding objects; and
- an object recognition unit for comparing information regarding the target object to the information regarding objects stored in the second storage, and recognizing the target object as a certain object from among the objects stored in the second storage according to a result of the comparison.

26. The image processing apparatus of claim 25, wherein the information regarding objects includes Histogram of Oriented Gradients (HOG) information including edge information, and Hue Saturation Value (HSV) information including color information.

27. A non-transitory computer readable recording medium having recorded thereon a computer program for executing an image processing method, comprising:
- segmenting each image in a series of obtained images into segments;
- calculating a central point of each segment, wherein the central point of each segment corresponds to a center of a figure of the segment;
- calculating a distance between at least two central points of two neighboring segments; and
- setting at least one segment selected from among segments appearing in a plurality of the images as a target object based on movement variances determined for the central points of the segments throughout the series of images.

* * * * *